United States Patent
Lucas-Woodley et al.

(10) Patent No.: US 9,286,724 B2
(45) Date of Patent: *Mar. 15, 2016

(54) AUGMENTED REALITY SYSTEM

(71) Applicant: Sony Computer Entertainment Europe Limited, London (GB)

(72) Inventors: Thomas Lucas-Woodley, London (GB); Nicholas Andrew Lord, London (GB); William Oliver Sykes, London (GB); Adrien Bain, London (GB)

(73) Assignee: Sony Computer Entertainment Europe Limited (GB)

(*) Notice: Subject to any disclaimer, the term of this patent is extended or adjusted under 35 U.S.C. 154(b) by 93 days.

This patent is subject to a terminal disclaimer.

(21) Appl. No.: 13/875,533

(22) Filed: May 2, 2013

(65) Prior Publication Data

US 2014/0002497 A1 Jan. 2, 2014

(30) Foreign Application Priority Data

May 11, 2012 (GB) .................................. 1208259.0

(51) Int. Cl.
*G09G 5/00* (2006.01)
*G06T 19/00* (2011.01)
*B42D 1/00* (2006.01)
*G06K 9/32* (2006.01)
(Continued)

(52) U.S. Cl.
CPC ............... *G06T 19/006* (2013.01); *B42D 1/00* (2013.01); *A63F 2300/8082* (2013.01); *G06K 9/00671* (2013.01); *G06K 9/3208* (2013.01); *G06K 9/3216* (2013.01); *G06K 2009/3225* (2013.01); *G06T 11/00* (2013.01); *G06T 2207/30176* (2013.01)

(58) Field of Classification Search
None
See application file for complete search history.

(56) References Cited

U.S. PATENT DOCUMENTS

2010/0230946 A1* 9/2010 Kanda ............................. 283/85
2011/0316266 A1* 12/2011 Miranti ........................... 281/38
2012/0081394 A1* 4/2012 Campbell et al. ............. 345/633

FOREIGN PATENT DOCUMENTS

EP 2426641 A1 3/2012
KR 100788961 B1 12/2007
KR 20120052128 A 5/2012

OTHER PUBLICATIONS

Author: Lewis et al.; Title: Data Structures & Their Algorithms, Date: 1991.*

(Continued)

*Primary Examiner* — Jwalant Amin
(74) *Attorney, Agent, or Firm* — Lerner, David, Littenberg, Krumholz & Mentlik, LLP

(57) ABSTRACT

A book for use in an augmented reality system comprises a plurality of leaves, each side forming a page of the book, with each page comprising a fiduciary marker. The book also includes a cover having larger dimensions than the book's leaves. Thus, the cover's extremhities extend beyond the outer edges of the pages. The inside of the cover comprises a first high contrast pattern along at least a first such extremity. An entertainment device for use in the augmented reality system comprises input means to receive a video image of the book, and image processing means to estimate a position and orientation of the book from a fiduciary marker of the book captured in the video image, to estimate a position and orientation of the first high contrast pattern, and to distinguish between one or more leaves of the book being turned independently of the cover of the book.

7 Claims, 10 Drawing Sheets

(51) Int. Cl.
*G06K 9/00* (2006.01)
*G06T 11/00* (2006.01)

(56) References Cited

OTHER PUBLICATIONS

Search Report dated Sep. 12, 2012 for Application No. GB1208259.0.
Extended European Search Report for Application No. EP 131650720 dated Aug. 2, 2013.
Grasset R et al: "The design of a mixed-reality book: Is it still a real book?", Mixed and Augmented Reality, 2008. ISMAR 2008. 7th IEEE/ACM International Symposium on, IEEE, Piscataway, NJ, USA, Sep. 15, 2008, pp. 99-102.
Anonymous: ". . . New Horizon . . . ", Mar. 11, 2012, XP055200513, Retrieved from the Internet: <URL:https://web.archive.org/web/20120311054234/http://www.tokyoshoseki.co.jp/books/miraikei/>, [retrieved on Jul. 7, 2015].
Anonymous: "Augmented Reality Shows Up in a Japanese Textbook (video) link, Bits, & Pixels", Apr. 8, 2012, XP055200439, Retrieved from the Internet: <URL:http:/lthe-digital-reader.com/2012/04/08/augmented-reality-showsup-in-a-japanese-textbook-video/>, [retrieved on Jul. 6, 2015].
European Examination Report for Application No. 13160720.2 dated Jul. 21, 2015.
Tokyoshosekii: "New Horizon AR . . . ", Apr. 8, 2012, XP054975961, Retrieved from the Internet: <URL:https://www.youtube.com/watch?v=j4qgT2QJUFA>, [retrieved on Jul. 7, 2015].

\* cited by examiner

US 9,286,724 B2

AUGMENTED REALITY SYSTEM

CROSS REFERENCE TO RELATED APPLICATIONS

The present application claims the benefit of and priority to GB Application No. 1208259.0, filed May 11, 2012, the entire disclosure of which is incorporated by reference herein.

BACKGROUND OF THE INVENTION

1. Field of the Invention

The present invention relates to an augmented reality system.

2. Description of the Prior Art

Augmented reality refers to the process of capturing a video image of an environment, and augmenting that video image with computer graphic elements (typically depicting virtual objects such as game characters that are to appear as if part of the environment). To provide a convincing augmentation, it is desirable for these computer graphic elements to be displayed in a manner consistent with the environment, particularly in terms of scale, range of motion, and viewing angle. Thus for example if the video image of the environment (referred to herein also as the 'scene') depicts a floor or table-top from a particular view point, it is desirable that the computer graphic elements are scaled and oriented so as to appear to properly rest on that surface, and to move on it in a physically consistent fashion.

However, the determination of the scale and orientation of elements of the scene, and hence of the virtual objects that are superposed on them, is a non-trivial task.

Referring now to FIG. 1, consequently in a typical augmented reality application a so-called fiduciary marker 1010 of a known size is included in the environment to be captured by the video camera, in order to provide an easily detectable and known feature whose scale and orientation can be more readily estimated.

Such fiduciary markers are typically high-contrast (e.g. black and white) so providing scope for pattern recognition in even relatively poor image capture conditions (e.g. with low resolution image capture, poor lighting, and the like). The patterns themselves usually comprise a thick quadrilateral boundary containing an asymmetric distribution of blocks or tiles, which enable a disambiguation of the orientation of the marker. Consequently the recognition process typically provides an estimation of the position (x and y axis position in the image) and rotation (by virtue of the marker's asymmetry) of the fiduciary marker within the captured video image.

Optionally in addition the distance of the fiduciary marker (its z-axis position) from the video camera may be estimated by comparing the size of the fiduciary marker in the captured image with a known size of the fiduciary marker (e.g. its size in pixels at a distance of 1 meter); in other words, its scale.

Similarly, optionally a tilt of the fiduciary marker (i.e. its deviation from the x-y plane in the z direction) may be estimated by comparing the aspect ratio of the fiduciary marker in the captured image with the known aspect ratio of the fiduciary marker, and/or using other techniques such as detecting foreshortening (where a rectangular shape appears trapezoidal) or other distortions of the fiduciary marker in the captured video image.

The generated graphical overlay typically comprises a virtual graphics element that can then be superposed over the fiduciary marker, with the estimated position, rotation distance and tilt of the fiduciary marker used to modify the virtual graphics element as applicable.

The augmented image is then output to a display.

The subjective effect of this process is that the output video image comprises a graphical element (for example a monster or a castle) in place of the fiduciary marker, typically replicating the estimated position, rotation, distance and tilt of the fiduciary marker and hence also the surface of the environment upon which the marker has been placed.

However, it will be appreciated that in such augmented reality systems the user's suspension of disbelief, which makes them complicit in the illusion that the graphical overlay is part of the captured scene, is at least in part dependent upon the reliability with which the graphical overlay matches or interacts with some real-world aspect of the scene. This reliability is frequently dependent upon estimates of the position and orientation of the fiduciary marker within the scene.

Thus it is desirable to reduce the occasions upon which such estimates cannot be reliably made, and to improve the consistency of estimates that are made.

SUMMARY OF THE INVENTION

In a first aspect, a book for use in an augmented reality system is provided in accordance with claim 1.

In another aspect, an entertainment device for use in an augmented reality system is provided in accordance with claim 10.

In another aspect, an augmented reality system is provided in accordance with claim 13.

In another aspect, a method of augmenting a video image of a book is provided in accordance with claim 14.

In another aspect, a computer program is provided in accordance with claim 15.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

A book, an entertainment device, an augmented reality system and a method for augmenting a video image of a book is disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
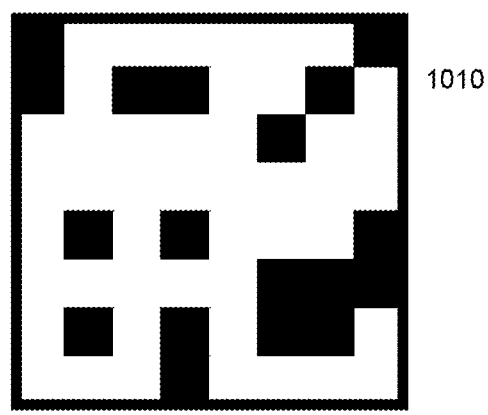
FIG. 1 is a schematic diagram of a fiduciary marker according to an embodiment of the present invention.
Figure 2A:
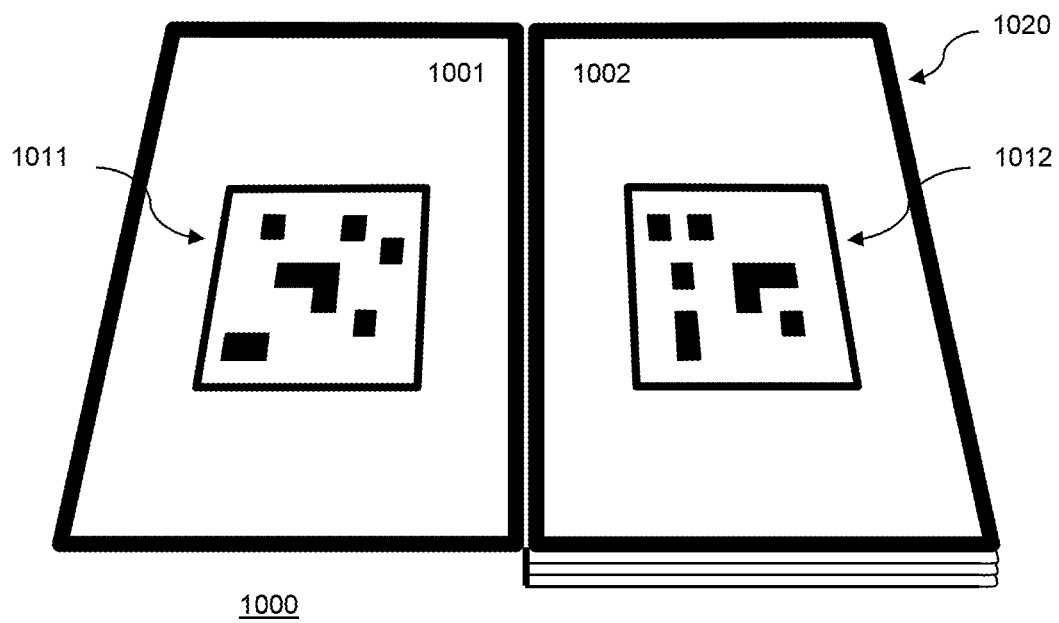
FIG. 2A is a schematic diagram of a book according to an embodiment of the present invention.
Figure 2B:
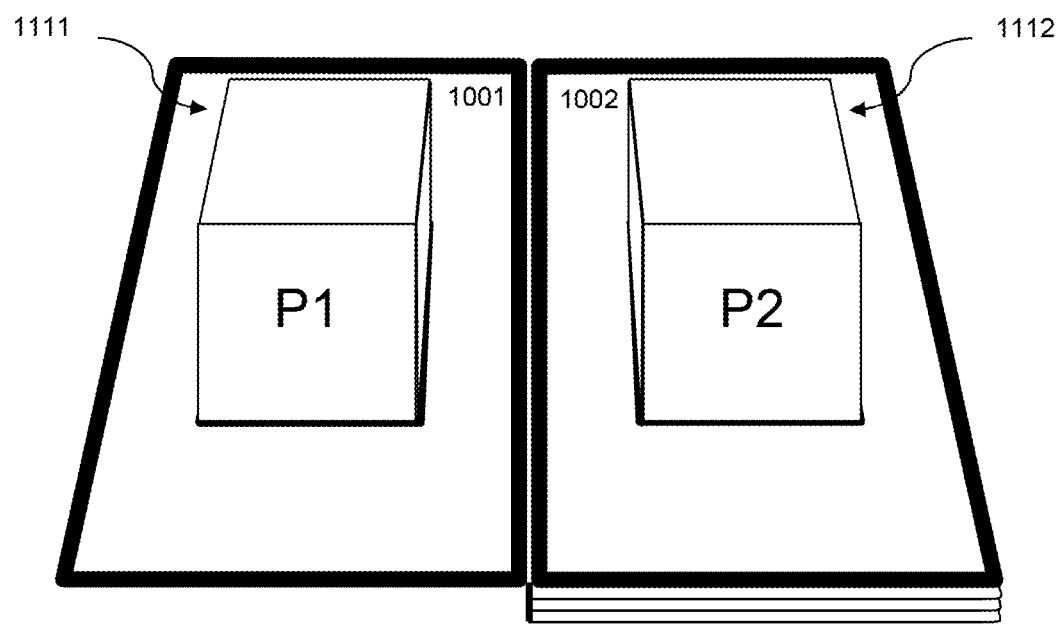
FIG. 2B is a schematic diagram of an image of a book overlaid with computer graphic augmentations according to an embodiment of the present invention.

Referring now to FIGS. 2A and 2B, in an embodiment of the present invention a book 1000 has a plurality of rigid, turnable leaves (a so-called 'board book'), and comprises fiduciary markers 1011, 1012 on each page 1001, 1002, as shown in FIG. 2A. A leaf will be understood to be a single turnable sheet or panel of a book and typically comprises a page on each side. FIGS. 2A and 2B show, by way of example, pages 1 and 2 (respectively labelled 1001 and 1002). Optionally the inside front and/or back covers of the book may also act as pages and comprise fiduciary markings. Hence in this example, page 1 may in fact be the inside front cover. Similarly, optionally the outside front and/or back covers may comprise fiduciary markings. In addition, optionally each page is edged with a high contrast marking 1020 at the outside edges to facilitate detection of the extent of the page.

An entertainment device coupled to a video camera can capture an image of the book and use known techniques to detect the fiduciary markings on each visible page and hence locate those pages of the book. Given this information, then as illustrated in FIG. 2B an entertainment device can augment the captured video image of the book with virtual graphic elements 1111, 1112 corresponding to the placement, scale and orientation of the fiduciary markings 1011, 1012 on the visible pages, and output the augmented video image for display. In this way the displayed version of the book becomes a 'magic' pop-up book in which the pages can come to life.

Figure 3:
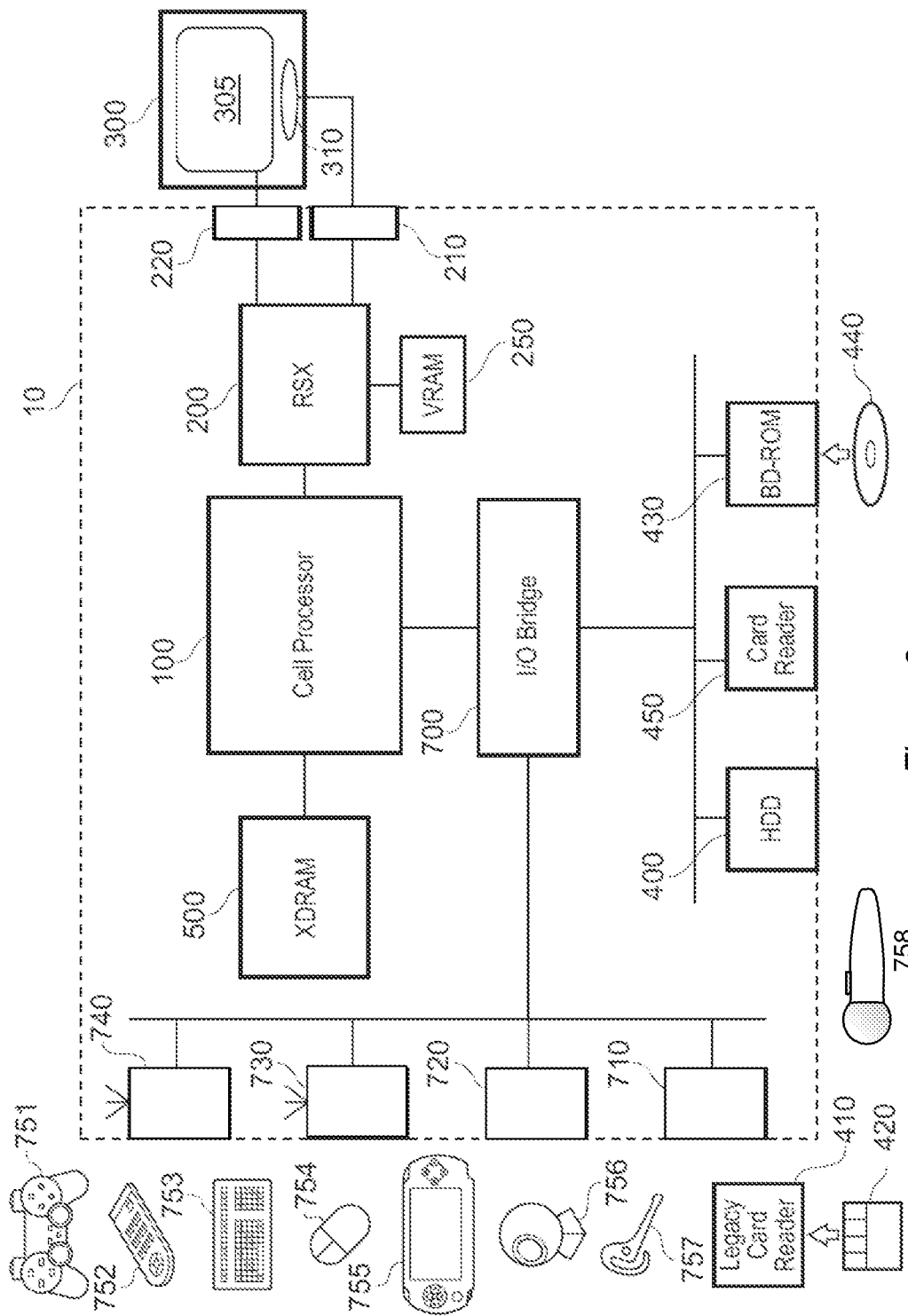
FIG. 3 is a schematic diagram of an entertainment device according to an embodiment of the present invention.

Turning now to FIG. 3, this schematically illustrates the overall system architecture of a suitable entertainment device known as the Sony® Playstation 3® entertainment device or PS3®. The PS3 comprises a system unit 10, to which various peripheral devices are connectable including a video camera, as detailed below.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

In particular, these connections enable a video camera such as an EyeToy® video camera 756 (or a stereoscopic video camera, not shown) to be coupled to the PS3 in order to capture a video image (or stereoscopic video image pair) of the book.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the portable entertainment device 755 or the Playstation Move® 758 may be used as a controller. In the case of the portable entertainment device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In embodiments of the video camera, it is stereoscopic. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled person will be aware that a device driver or similar software interface may be required in the present embodiment described.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 4:
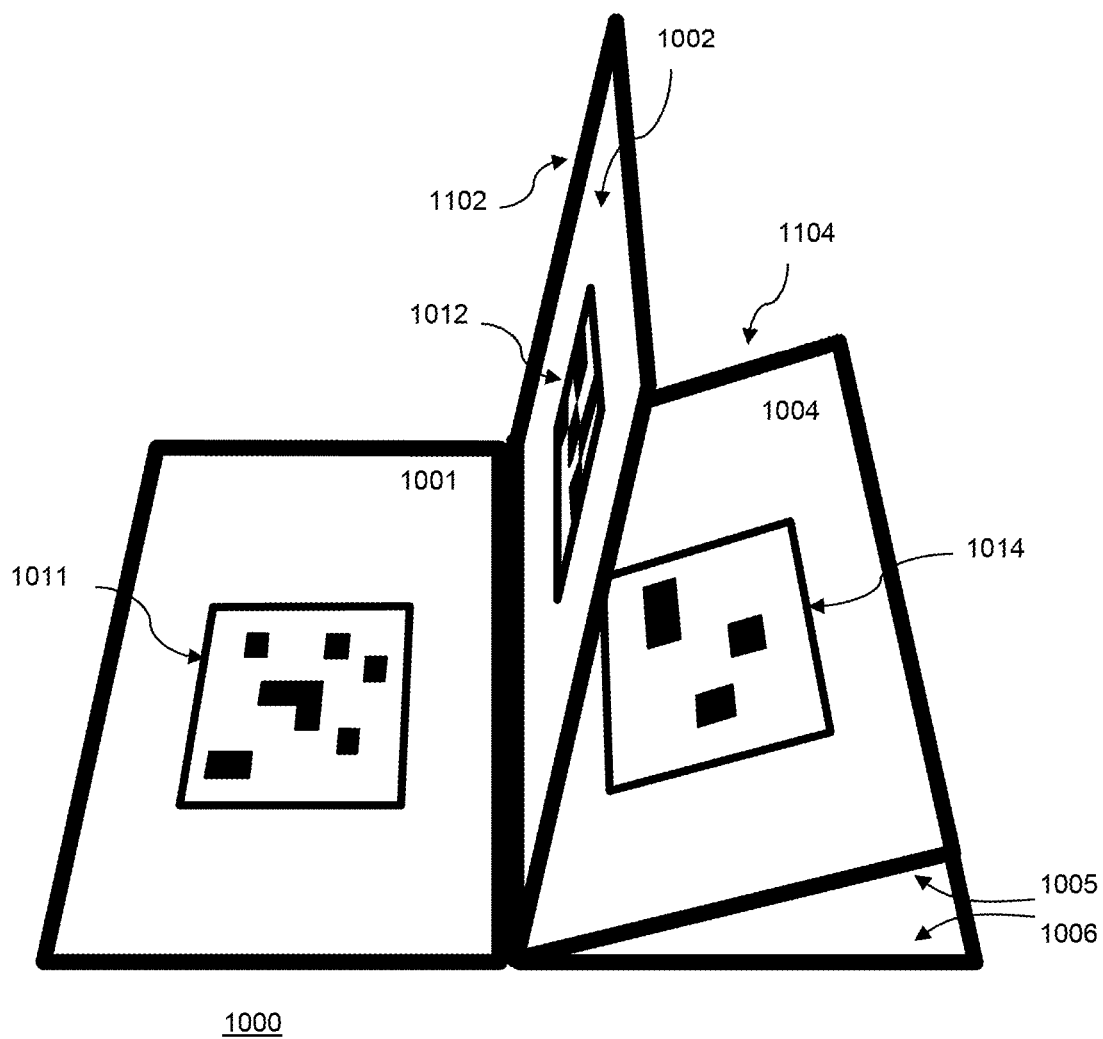
FIG. 4 is a schematic diagram of a book according to an embodiment of the present invention.

Referring now to FIG. 4, it will be appreciated that whilst the fiduciary markers may be readily detected when the book is laid open and flat, several problems arise from the process of turning leaves of the book.

Firstly, it will be appreciated that as a user turns over a rigid leaf 1102 of the board book 1000, then for example pages 1 and 2 become obscured whilst page 3 (not shown, but located on the face of the leaf 1102 opposite to page 2) and page 4 (1004) are revealed. When the turning action is complete and pages 3 and 4 are fully revealed, the system can provide image augmentation of pages 3 and 4 in a similar manner to that previously described for pages 1 and 2 with reference to FIG. 2B.

However, a first problem that arises is that during the process of turning these pages there comes a point where the fiduciary marker 1012 on page 2 (for example) becomes so distorted by being viewed nearly edge-on to the camera that it is no longer recognisable by the entertainment device. At this point it becomes preferable to use an alternative technique of determining the position of the turning leaf of the book so that any animations dependent upon it (for example a pop-up animation showing objects between pages 1 and 2 folding down, or unfolding between pages 3 and 4) are able to continue appropriately.

Such a technique is described in co-pending European application 10175548.6, incorporated herein by reference. A brief summary of the technique is described below with reference to FIG. 5.

In a first step s10, a scene comprising the book is captured by a video camera or similar image capture device operably coupled to an image input of the PS3 (such as a USB port), resulting in an image including the book. As noted previously, the book itself comprises substantially rigid leaves.

In a second step s20, the PS3 attempts to detect fiduciary markings in the image (i.e. those visible in the book), for example using the Cell processor operating under suitable software instruction as a marking detector. Typically not all of a fiduciary marker is required to identify it if it comprises some form of spatially distributed redundancy in its markings.

In a third step s30, the image or partial image of the of the fiduciary marker on a page of the book is compared with a reference version of the marker to determine orientation and scale, and given a known physical relationship to the page (i.e. its printed position) this also provides an estimate of the orientation and scale of the book and in particular the placement of the spine of the book, which acts at the origin of rotation for the leaves of the book. Again the Cell processor may perform the comparison and the estimate the placement of the spine of the book, and the reference versions of the markers may be stored in RAM, on the hard disc, on an optical disk or on remote storage, or any other suitable storage medium or combination thereof.

Based upon the origin of rotation coincident with the spine of the book, in a fourth step s40 a plurality of possible positions for a turning leaf of the book are hypothesised. In particular, given the size of the leaf then the positions of the free edges of the leaf are hypothesised. Again here the Cell processor may operate as the hypothesising means.

To provide a basis of comparison with these hypotheses, in a fifth step s50 the captured image is processed to generate an image in which edges are identified. In addition data indicating the directions of these edges is generated. The image processing may be performed by the Cell processor, the Reality Synthesiser graphics unit or a combination of the two.

In a sixth step s60, the hypothesised edges of the turning leaf of the book are each evaluated with respect to the image comprising the identified edges and the directions of these edges using one of several possible scoring criteria as described previously. Again this evaluation or comparison may be performed using the Cell processor operating under suitable software instruction. Typically however, it is not necessary to compare each hypothesised edge with all the pixels of the processed image.

In a seventh step s70, the hypothesis whose predicted free edges of the turning leaf generate the best score is assumed to be the best match to the actual turning leaf's position, with the Cell processor performing the selection of this hypothesis.

Finally in an eighth step s80 a virtual graphic element such as a picture or a polygonal object (e.g. a 2D rendering of a 3D virtual object) is superposed or otherwise incorporated into the captured image to augment it at a position consistent with the winning hypothesis. This image augmentation may be achieved by the Reality Synthesiser graphics unit combining the video and graphical elements, typically according to instructions from the Cell processor. The virtual graphic element itself may be stored locally in RAM, on the hard disc, or on an optical disk, may be remotely stored, or may be the product of a procedural graphics generation process such as a tree growth process.

Figure 5:
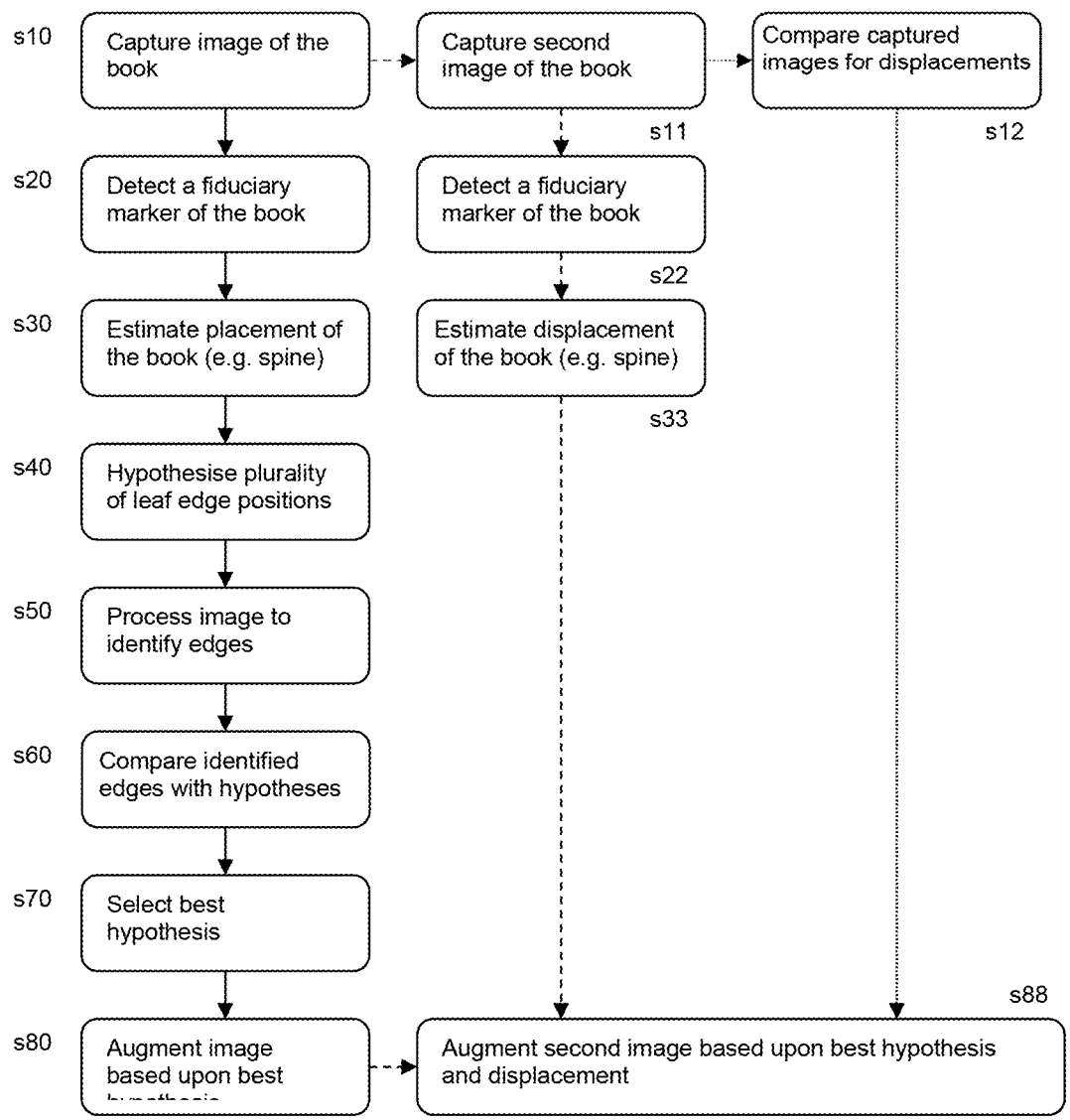
FIG. 5 is a flow diagram of a method of tracking the turning of a leaf of the book, in accordance with an embodiment of the present invention.

Other possible steps are shown in FIG. 5 using dashed arrows. These include steps s11, s22, s33, which replicate steps s10, s20, and s30 for a second image of a stereoscopic image pair, and step s88, which replicates step 80 for an offset position (displacement) in the second image. Similarly, using dotted arrows step s12 provides an alternative determination of the displacement to that of s11, s22 and s33 using a direct image comparison for a stereoscopic image pair, for example by the Cell processor. In either case, this enables 3D augmentation for a stereoscopic display.

It will be appreciated that the above steps need not necessarily all be implemented in the above order. For example, the fifth step s50 may occur immediately after the first step s10.

It will be appreciated in general that the fiduciary markers may be used to initially detect the location, scale and orientation of the book, and to identify the page numbers, but then the bold edging of the pages may be used alternatively or in addition to the fiduciary markers for frame-by-frame tracking of the book position, with the fiduciary markers only re-appraised periodically or when the Cell processor detects a shape of the page that may be ambiguous and require a non-symmetrical marker to resolve.

As noted previously, one reason for wanting to accurately model the turning of a leaf of the book by the entertainment device is to provide an augmentation of the book that tracks the turning leaf faithfully, not only on the visible page(s) being turned but also in order to augment the new page(s) being revealed.

One problem with augmenting new pages is that in order to provide the illusion that the new page is also 'magical', the augmentation should begin as soon as any part of the page becomes visible—which will typically occur before that page's fiduciary marker becomes visible to the entertainment device. As a result, the identity of the specific page is not known before it becomes desirable to augment it.

One solution is to provide a supplementary non-alphanumeric marker close to the edge of the page facing the camera, which will be detectable earlier in the process of revealing the new page (see later herein), but even then there will still be conditions where such marks are not immediately visible or resolvable.

Consequently the entertainment device may be arranged to augment a partial view of an unknown page.

In this case, the entertainment device may be arranged to augment the visible portion of the newly revealed page using a generic graphic or colour scheme consistent with the augmentations used in the book, or may assume that only one leaf is being turned and select the augmentation suitable for the next pair of pages, pending confirmation by the supplementary marker, if present, and/or eventually the fiduciary markers of those pages. These approaches may be assisted by generally designing the augmentations to be generic or at least low in detail around the edges of the pages of the book, so that generic augmentations can be discretely replaced with page specific augmentations as the page is identified.

Figure 6:
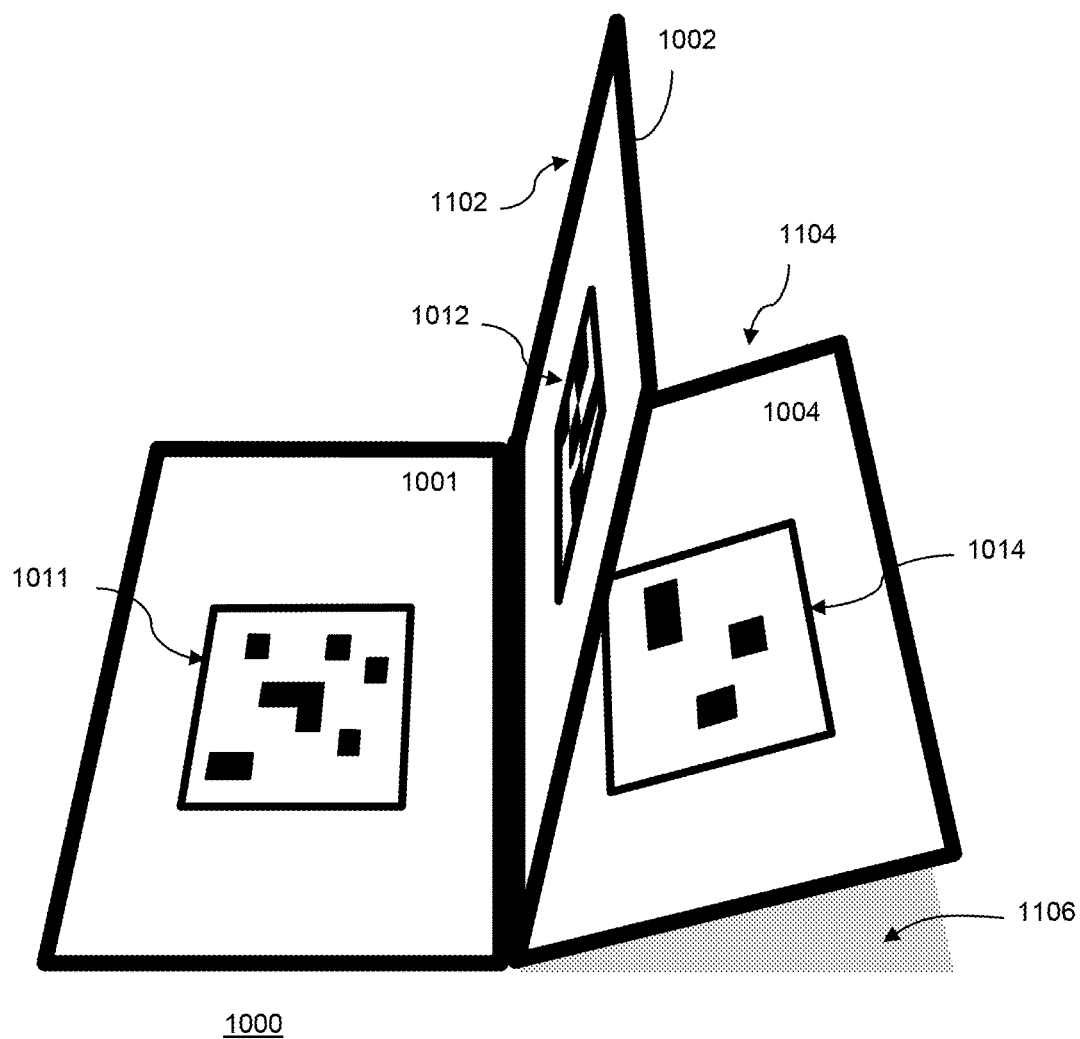
FIG. 6 is a schematic diagram of a book according to an embodiment of the present invention.

However, this approach assumes that there is in fact a new page to be revealed; referring now to FIG. 6, it will be appreciated that there is scope for error when the first or last page of the book is turned to close it (i.e. where that page is on an inside cover). In this case there is no page to be revealed beneath it (although there may be a shadow 1106 that looks confusingly like a page).

In conjunction with the above described strategy to augment a newly revealed page before any confirmatory markers are visible on it, this could result in augmenting a non-existent page, resulting in the display of a generic augmented page outside the cover of the book as the book is being closed, which is only removed once the front or back cover of the book is identified by the entertainment device. Clearly this is undesirable.

It will be appreciated that a solution is possible for the case where the book was initially open on its first or last pages and hence these are visible; if the first page is turned toward the second page, then the entertainment device can be arranged to assume that the front cover is being closed, and similarly of the final page is turned toward the penultimate page then it can assume that the back cover is being closed.

However, knowledge of the current pages is no help when the user decides to close the book when it is currently open at an arbitrary pair of pages other than the first and last pair.

Figure 7:
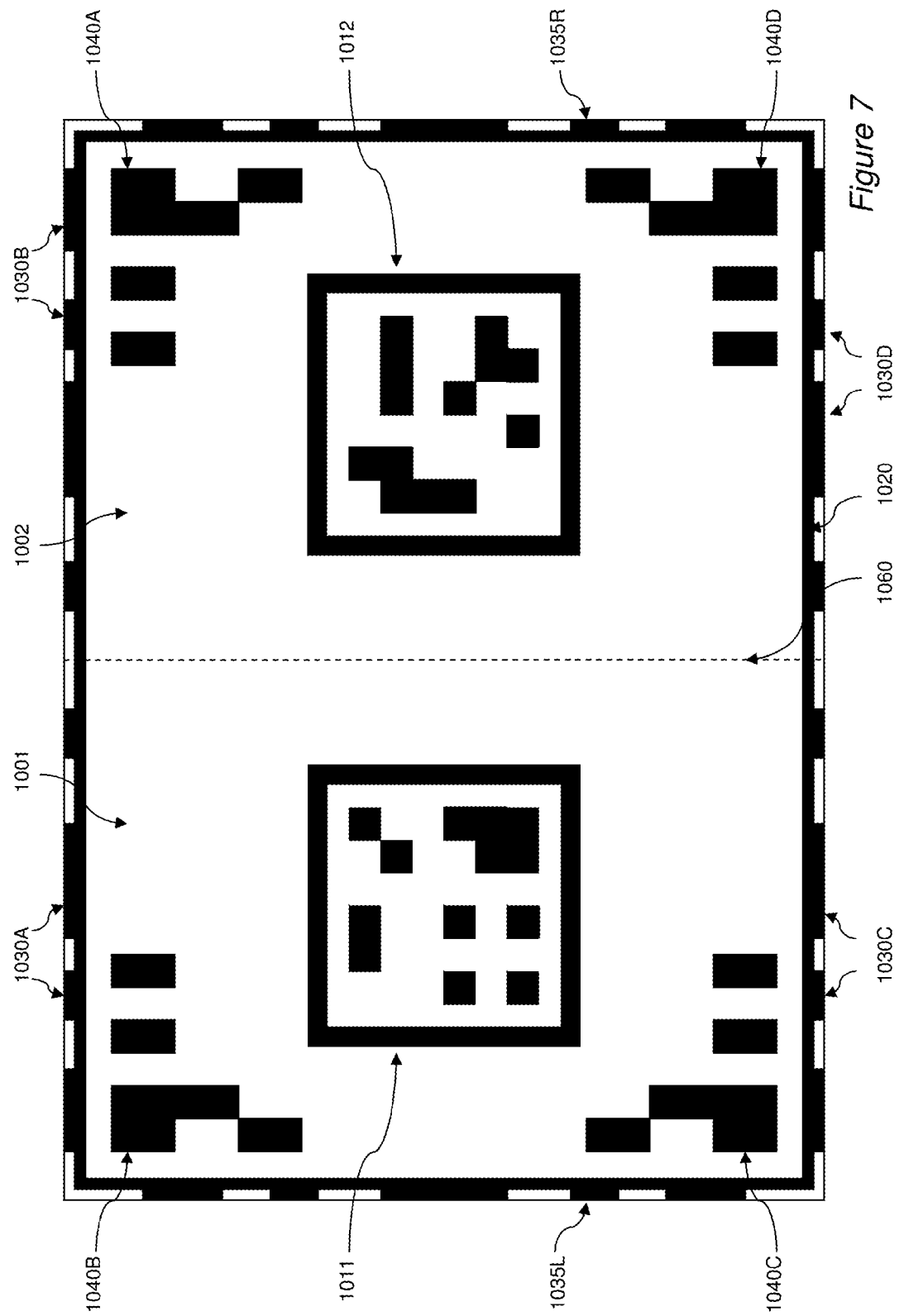
FIG. 7 is a schematic diagram of a book according to an embodiment of the present invention.

Accordingly, and referring now also to FIG. 7, in an embodiment of the present invention the book has a cover having larger dimensions than the leaves of the book, and hence having extremities that extend beyond the outer edges of each page when viewed from above, as in FIG. 7.

In an embodiment of the present invention, the cover comprises a high contrast pattern along at least a first such extremity (1030A), preferably being an extremity that will be positioned closest to the video camera in normal use. It will be appreciated that the high contrast pattern is thus printed on the inside cover at and near to the outer edge of the inside cover.

The high contrast pattern is typically comprised of black and white blocks, or similarly blocks of two contrasting colours or colour tones (such as light and dark blue). As such the two colours may then encode a bit pattern, with a respective colour or tone signifying 1 or 0. Hence the high contrast pattern can form a linear binary code along the aforementioned visible extremity of the inside cover of the book.

The high contrast pattern may be mirrored about the spine 1060 (and hence appear on the inside front and back covers)

and may also be mirrored about a centreline between the top and bottom of the pages, to form four copies of the high contrast pattern (1030A-D).

The high contrast pattern may encode information about the book (for example a title number) or may simply be random. A typical high contrast pattern may encode in the order of 6 to 20 bits. The light and dark elements of the pattern may adhere to a regular spacing scheme or have arbitrary or approximate spacing.

In addition, a high contrast pattern (1035L,R) may also be positioned along the lateral extremities of the book. This high contrast pattern may be the same as the high contrast pattern mentioned above, or may encode the same information in a different way, or encode different or additional information, or be random.

In any of the above cases, it will be appreciated that the covers have a predetermined physical thickness. Consequently, in an embodiment of the present invention, the high contrast pattern extends over the edge of the cover and across at least a predetermined proportion of the thickness of the cover, to improve its visibility at very acute angles with respect to the video camera.

In either case, the high-contrast pattern thereby provides a very early indication of the state of the book when a leaf is being turned. In particular, the high contrast pattern around the edge of the inside cover(s) of the book enables the entertainment device to disambiguate between when just leaves of the book are being turned, and when a cover of the book is being lifted from the supporting surface, for example to close the book. This is because the high contrast pattern will not move when internal leaves of the book are being turned, and only moves when one or both book covers are being turned.

More generally, because it is possible that turning the internal leaves of the book will result in some more general movement of the book at the same time, it is similarly possible to detect whether any incidental turning action of the cover is at the same rate as the turning action of the internal leaf or leaves of the book, and/or the extent to which this turning occurs. If the cover rotates by a similar amount to the internal leaf, then it can be assumed that the book is being closed, whereas if the cover rotates at a smaller rate, or by a smaller extent—or in a manner uncorrelated with the internal leaf (e.g. having a motion correlation below a predetermined threshold amount) then it can be assumed that the turning of the internal leaf or leaves will still result in the revealing of a page of the book.

Thus also more generally, the high contrast pattern acts as a one-dimensional binary pattern that may be used to estimate the resting angles of the covers of the book, and hence also the resting angles of the leaves of the book; hence if the book is laid on a table, the book covers may lie flat, indicating an angle of 180 degrees between opposing pages. Meanwhile if the book is held in a user's lap, the covers may have a relative angle of 165 degrees, for example, which can be used to provide a baseline angle for augmenting the reveal of new pages as the angles of turning leaves change with respect to it. If the angles of the high contrast pattern change in a manner uncorrelated with the change in angle of the leaves of the book as noted previously, then this can be treated as a modification of the baseline angle even as if pages of internal leaves of the book are being turned at the same time.

Referring again to FIG. 7, the identification of a page (or an opposing pair of pages) can be made more rapidly by providing non-alphanumeric patterns (1040A-D).

On each page such a non-alphanumeric pattern (1040A, 1040B) can be positioned closer to an outside edge of the page of the book than the fiduciary marker. Typically, this non-alphanumeric pattern is positioned between the fiduciary marker and the edge of the page that is furthest from the user of the book and thus also closest to the video camera for the most typical usage of the book, in which the video camera is positioned close to the TV on which the augmented images are to be displayed, and the user is facing the TV and holding the book. The non-alphanumeric pattern can similarly be positioned between a corner of the fiduciary marker and the corner of the page, as illustrated in FIG. 7.

Notably, the non-alphanumeric pattern can thus form an shape (e.g. follow the outer edge of the book around the corner). In this case the non-alphanumeric pattern is therefore positioned closer to both edges than the fiduciary marker.

Notably, unlike the fiduciary marker, the non-alphanumeric pattern is not needed to initially determine the position, scale or orientation of the book. As a result the non-alphanumeric pattern can in principle be ambiguous in terms of scale and/or orientation, as these aspects of the pattern can be resolved with reference to the fiduciary markers in the book.

Figure 8:
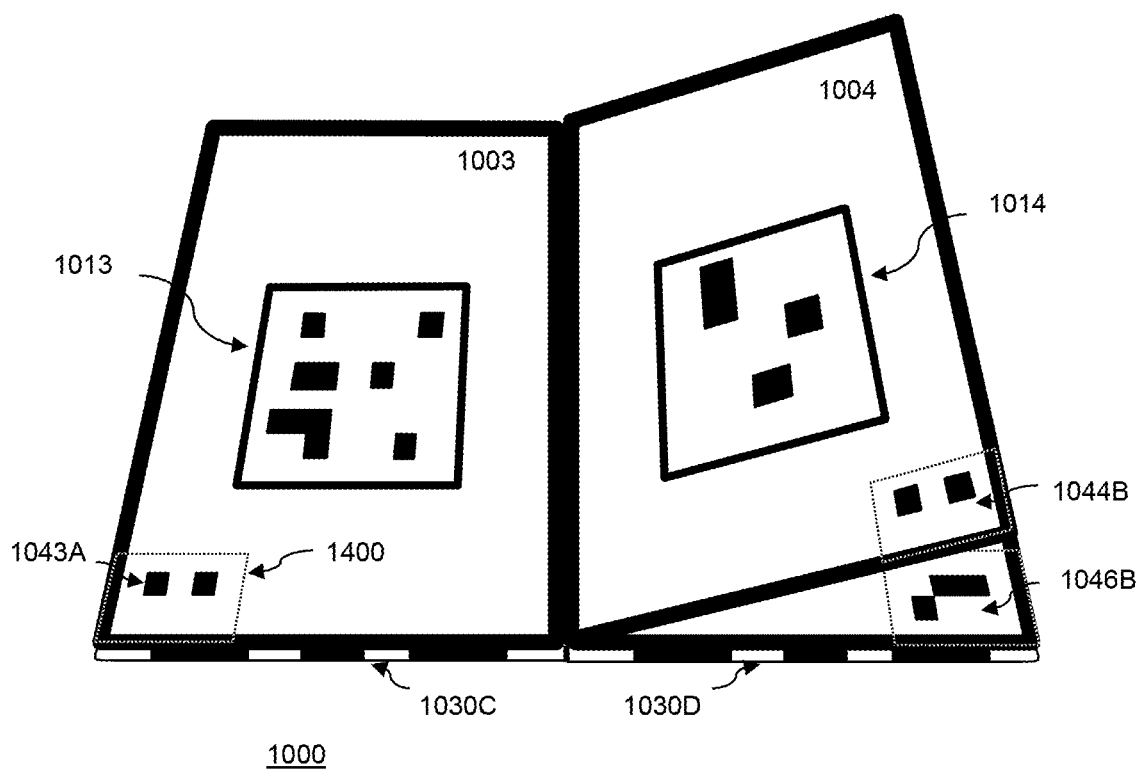
FIG. 8 is a schematic diagram of a book according to an embodiment of the present invention.

Referring now to FIG. 8, this shows a camera-view of the book as the leaves are being turned. Notably because the non-alphanumeric pattern is closer to the edge of the book facing the camera than the Fiduciary marker on the same page, it can be captured by the camera earlier in the process of the page being revealed and thus provide an early indication of what page is to be revealed as the user turns leaves of the book.

In the example of FIG. 4, the book is currently open on pages 3 and 4 (1003, 1004), and the fiduciary markers (1013, 1014) for these pages are visible, as are their respective non-alphanumeric patterns 1043A and 1044B, which in this case are shown as minor images of the same pattern for that opposing page pair.

In addition, the non-alphanumeric pattern 1046B, corresponding to pages 5 and 6 of the book, is visible due to the turning of page 4. It will be appreciated that the fiduciary marker on page 6 of the book will not become fully visible until page 4 has turned much further. It will also be appreciated that the positioning of the high contrast pattern (1030C, D) on the book covers indicates that there is a page to be revealed, and that the book is not being closed.

To provide an early but appropriate augmentation of the revealed page, the non-alphanumeric pattern 1046B can be identified using knowledge of the position, scale and orientation of the book obtained from the visible fiduciary markers on page 3 and (for now) page 4. Thus despite not having access to the fiduciary marker on page 6, and despite the possible rotational ambiguity of the non-alphanumeric pattern, the non-alphanumeric pattern can be used to indicate at least the opposing page pair when used in conjunction with the scale and orientation of the book as indicated by a fiduciary marker on a different, currently visible, page of the book.

Consequently, in addition to the use of generic augmentations very early on in the turning of an occluding leaf, the partially revealed page can now be augmented correctly much earlier in the process of revealing the page given knowledge of the position, scale and orientation of the book from a fiduciary marker on a different page and the earlier identification of what page is being revealed by the non-alphanumeric pattern on that new page, which greatly improves the sense of immersion and the suspension of disbelief for the user.

Figure 9:
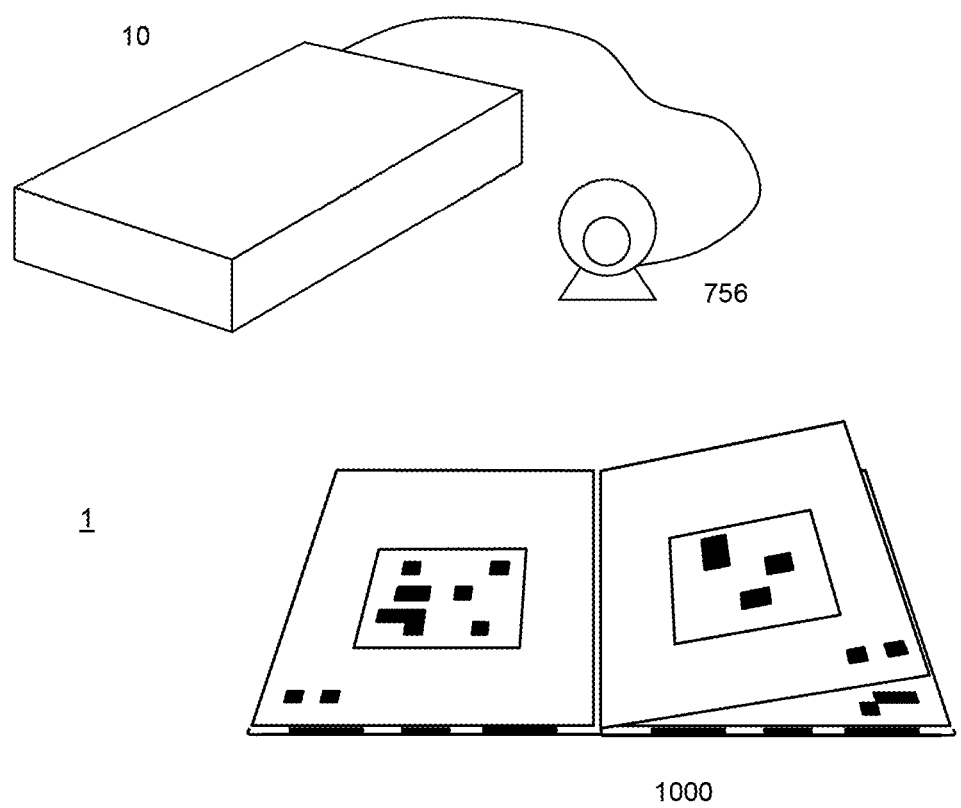
FIG. 9 is a schematic diagram of an augmented reality system according to an embodiment of the present invention.

Referring now also to FIG. 9, the book 1000, the entertainment device 10 and a camera 756 attached to or integral with the entertainment device together form an augmented reality system 1, in which the above described features of the book enable the above described disambiguation and augmentation processes of the entertainment device.

Hence, in a summary embodiment of the present invention, the book 1000 for use in an augmented reality system 1 comprises a plurality of stiff leaves, each side of which forms a page (1001, 1002) of the book, and in which each such page comprises a fiduciary marker (1101, 1102); and a cover having larger dimensions than said leaves of the book, and hence having extremities that extend beyond the outer edges of said pages, and in which the inside of the cover comprises a first high contrast pattern (1030A,B,C,D) along at least a first such extremity.

In an instance of the embodiment, the cover has a predetermined thickness (for example in the order of 1 to 5 mm), and the first high contrast pattern extends over the edge of the cover and across at least a predetermined proportion of the thickness of the cover, for example half the thickness.

In an instance of the embodiment, the first high contrast pattern extends along at least a first extremity of the book that faces a video camera of the augmented reality system in normal use. As noted previously, normal use is typically that the user is facing a TV with the book held or positioned between them and the TV with the book oriented so that the spine of the book is pointing generally toward either the TV or the video camera (excluding any active interactions with the book or specific instructions about its placement), and the video camera used to capture the image of the book is located near the TV and facing towards the area occupied by the user and the book.

In an instance of the embodiment, a high contrast pattern extends along each extremity extending beyond a top or bottom edge of the pages of the book as viewed by a video camera of the augmented reality system in normal use. In other words, the pattern extends along extremities perpendicular to the spine of the book. In such a case, this pattern may be the first high contrast pattern reflected about a centreline coincident with the spine of the book, as illustrated in FIG. 7.

In any event, as noted previously the first high contrast pattern may encode information about the book.

In an instance of the embodiment a second high contrast pattern (1035R,L) extends along each extremity extending beyond a left or right edge of the pages of the book as viewed by a video camera of the augmented reality system in normal use. In other words, the pattern extends along extremities parallel with the spine of the book.

In this case, as noted previously the second high contrast pattern may encode different information to the first high contrast pattern.

In an instance of the embodiment, the book may comprise one or more non-alphanumeric patterns (1040A,B,C,D), and on a page such a non-alphanumeric pattern is positioned closer to an outside edge of the page than the fiduciary marker on that page. As noted previously, the non-alphanumeric pattern is then capable of indicating at least the opposing page pair comprising the respective page on which the non-alphanumeric pattern is positioned, when used in conjunction with the scale and orientation of the book as indicated by a fiduciary marker on a different page.

In the summary embodiment, an entertainment device 10 is used in an augmented reality system, and comprises input means, such as a USB connector 710 or a wireless link (730, 740), operable to receive a video image of the book. The entertainment device also comprises image processing means, such as the Cell processor 100 operating under suitable software instruction, operable to estimate a position and orientation of the book from a fiduciary marker of the book captured in the video image, and image processing means, such as again the Cell processor 100 operating under suitable software instruction, operable to estimate a position and orientation of a first high contrast pattern on an extremity of an inside cover of the book captured in the video image. In the summary embodiment, the image processing means is operable to distinguish between one or more leaves of the book being turned independently of the cover of the book, as opposed to the turning of a cover of the book, in response to the position and orientation of the first high contrast pattern.

In other words, given the estimate of the position of the book based upon one or more fiduciary markers of the book, the entertainment device can estimate where the high contrast pattern should be if the cover(s) of the book remain at rest. If they remain there when the entertainment device detects that one or more leaves of the book are being turned, then it can assume that a new page is being revealed, whereas if the covers move (or optionally if they move in a corresponding manner to the turning leaf or leaves) then it can assume that the book is being closed and that a new page is not being revealed.

In an instance of the embodiment, the entertainment device comprises processor means such as the Cell processor 100 and/or the RSX 200, operable to augment a captured video image of the book with one or more graphical elements, and in which the processor means augments the image of the book with a representation of a partially revealed augmented page of the book in the event that the image processing means detects that one or more leaves of the book are being turned independently of the cover of the book.

In an instance of the embodiment, the entertainment device comprises processor means such as the Cell processor 100 and/or the RSX 200, operable to augment the image of the book with a page-specific representation of a corresponding partially revealed augmented page of the book in the event that the image processing means detects a non-alphanumeric pattern (1040A,B,C,D) on that page using scale and orientation information estimated from a fiduciary marker on a different page of the book.

In the summary embodiment, an augmented reality system comprises a book and an entertainment device of the type described, and a video camera such as the EyeToy or PlayStation Eye 756 arranged in operation to provide captured video images to the input means of the entertainment device.

Figure 10:
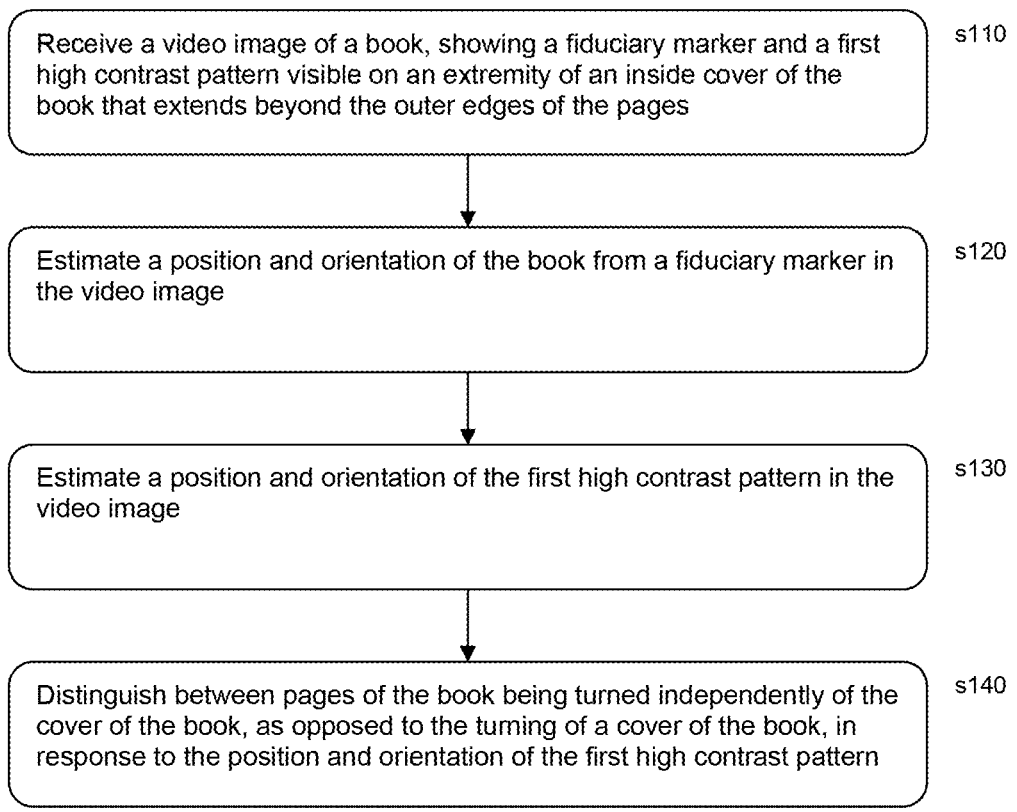
FIG. 10 is a flow diagram of a method of augmenting a video image of a book according to an embodiment of the present invention.

Turning now to FIG. 10, a method of augmenting a video image of a book comprises:

In a first step s110, receiving a video image of a book in which one or more pages are visible, and in which each visible page comprises a fiduciary marker, and in which a first high contrast pattern is visible on an extremity of an inside cover of the book that extends beyond the outer edges of said pages.

In a second step s120, estimating a position and orientation of the book from a fiduciary marker in the video image.

In a third step s130, estimating a position and orientation of the first high contrast pattern in the video image.

And in a fourth step s140, distinguishing between one or more pages of the book being turned independently of the cover of the book, as opposed to the turning of a cover of the book, in response to the position and orientation of the first high contrast pattern.

It will be apparent to a person skilled in the art that variations in the above method corresponding to operation of the various embodiments of the apparatus as described and claimed herein are considered within the scope of the present invention.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or in the form of a transmission via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

Although illustrative embodiment of the invention have been described in detail herein with reference to the accompanying drawings, it is to be understood that the invention is not limited to those precise embodiments, and that various changes and modifications cane be effected therein by one skilled in the art without departing from the scope and spirit of the invention as defined by the appended claims.

We claim:

1. An entertainment device for use in an augmented reality system, comprising:
    input means for receiving a video image of a book;
    first image processing means for estimating a position and orientation of the book from a fiduciary marker of the book captured in the video image, and estimating a position and orientation of a turning leaf of the book captured in the video image; and
    second image processing means for estimating a position and orientation of a first high contrast pattern on an extremity of an inside cover of the book captured in the video image;
    and in which
    at least one of the first and second image processing means is operable to detect whether the position and orientation of the turning leaf and the cover of the book move in a corresponding manner; and
    at least one of the first and second image processing means is operable to distinguish between turning of the cover of the book and turning the leaves of the book independently of the cover of the book, in response to whether or not the position and orientation of the turning leaf and the cover of the book are detected to move in a corresponding manner.

2. An entertainment device according to claim 1, comprising:
    processor means for augmenting a captured video image of the book with one or more graphical elements; and in which
    the processor means augments the image of the book with a representation of a partially revealed augmented page of the book in the event that it is detected that one or more leaves of the book are being turned independently of the cover of the book.

3. An entertainment device according to claim 1, comprising:
    processor means for augmenting the image of the book with a page-specific representation of a corresponding partially revealed augmented page of the book in the event that a non-alphanumeric pattern is detected on that page using scale and orientation information estimated from a fiduciary marker on a different page of the book.

4. The entertainment device of claim 1, wherein the first image processing means and the second image processing means comprise a single image processing means.

5. An augmented reality system, comprising:
    a book comprising:
        a plurality of stiff leaves, each side of which forms a page of the book, and in which each such page comprises a fiduciary marker; and
        a cover having larger dimensions than said leaves of the book, and hence the cover having extremities that extend beyond outer edges of said pages; and in which
        the inside of the cover comprises a first high contrast pattern along at least a first such extremity;
    an entertainment device according to claim 1; and
    a video camera arranged in operation to provide captured video images to at least one of the first and second input means of the entertainment device.

6. A method of augmenting a video image of a book, comprising the steps of:
    receiving a video image of a book in which one or more pages are visible, and in which each visible page comprises a fiduciary marker, and in which a first high contrast pattern is visible on an extremity of an inside cover of the book that extends beyond the outer edges of said pages;
    estimating, with a processor, a position and orientation of the book from a fiduciary marker in the video image;
    estimating a position and orientation of a turning page of the book captured in the video image;
    estimating a position and orientation of the first high contrast pattern in the video image;
    detecting whether the position and orientation of the turning page and the cover of the book move in a corresponding manner; and
    distinguishing between turning of the cover of the book and turning the pages of the book independently of the cover of the book, in response to whether or not the position and orientation of the turning page and the cover of the book are detected to move in the corresponding manner.

7. A non-transitory computer program product comprising computer program instructions that when performed by a processor implement a method comprising the steps of:
    receiving a video image of a book in which one or more pages are visible, and in which each visible page comprises a fiduciary marker, and in which a first high contrast pattern is visible on an extremity of an inside cover of the book that extends beyond the outer edges of said pages;
    estimating a position and orientation of the book from a fiduciary marker in the video image;
    estimating a position and orientation of a turning page of the book captured in the video image;
    estimating a position and orientation of the first high contrast pattern in the video image;
    detecting whether the position and orientation of the turning page and the cover of the book move in a corresponding manner; and
    distinguishing between turning of the cover of the book and turning the pages of the book independently of the cover of the book, in response to whether or not the position and orientation of the turning page and the cover of the book are detected to move in the corresponding manner.

* * * * *